March 11, 1930.  J. L. SMITH ET AL  1,750,368
ROTARY VALVE FOR INTERNAL COMBUSTION ENGINES
Filed April 11, 1928
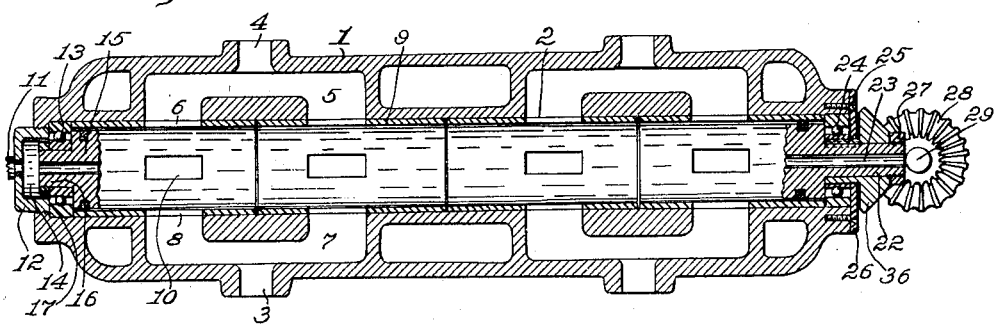
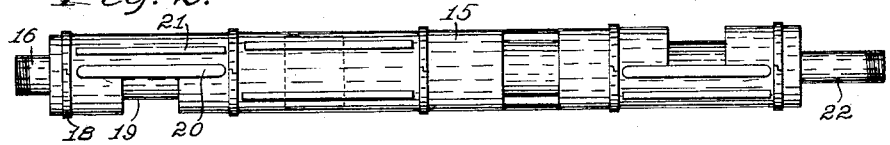
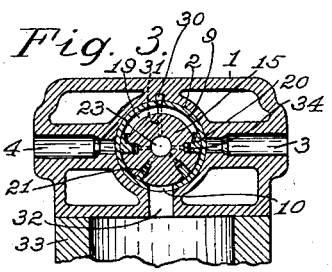
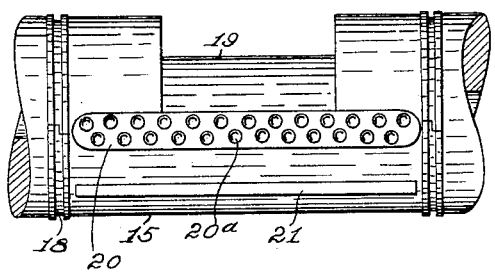
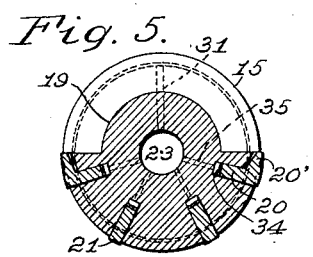
Inventors
John L. Smith, and
Foster L. Gushard,
By G. C. Kennedy.
Attorney Patented Mar. 11, 1930

1,750,368

UNITED STATES PATENT OFFICE

JOHN L. SMITH AND FOSTER L. GUSHARD, OF CEDAR FALLS, IOWA

ROTARY VALVE FOR INTERNAL-COMBUSTION ENGINES

Application filed April 11, 1928. Serial No. 269,078.

Our invention relates to improvements in rotary valves for internal combustion engines, and the object of our improvements is to furnish a rotary valve provided with different types of peripheral sealing devices to obviate bearing wear of the valve, and having centrifugally delivering means for liquid lubrication thereof, including carbon gathering and storing means for said sealing devices positioned intermediate the devices and the inclosing bearing thereabout.

The above objects we have accomplished by the means which are hereinafter described and claimed, and which are illustrated in the accompanying drawings, in which Fig. 1 is a central longitudinal section of the cylinder head block for a plurality of engine cylinders, including the rotary valve mounted therein, the medial part of the valve being broken away to disclose the bearing structures therefor; Fig. 2 is an elevation of said rotary valve as removed from its bearing seat in said head block, and Fig. 3 is a vertical cross section through the head block, its bearing and said rotary valve therein. Figs. 4 and 5 are taken on an enlarged scale, Fig. 4 being a fragmentary elevation of said rotary valve, comprising only the parts thereof for coacting with one of the engine cylinders, and Fig. 5 is a cross section of said rotary valve taken through the longitudinally disposed resiliently controlled sealing devices thereof.

Our invention is not restricted to the precise construction and arrangement of parts herein shown and described, nor to the various details thereof, as the same may be modified or rearranged in various particulars without departing from the spirit and scope of our invention, one practical embodiment of which has been herein illustrated and described without attempting to show all of the various forms and modifications in which our invention might be embodied.

It is well known that rotary engine valves which circumferentially directly bear upon the inclosing bushing or seat therefor soon become worn or eroded in use, whereby they leak and have to be discarded uneconomically. Our device successfully obviates this.

The numeral 1 denotes the cylinder head block to be removably mounted upon a cylinder block 33 in the usual way to supply four or more cylinders, but this invention includes the use thereof for any number of cylinders, one or more. The block 1 has interior hollows to supply a water jacket, and has a medial longitudinal cylindrical hollow 2 containing alined bushing sections 9, the bushing sections held in place by headed pins 30 (see Fig. 3) slidably mounted in a longitudinal groove in the interior wall of the hollow 2, their diminished inwardly projecting ends being also seated in outer longitudinal grooves in the bushing sections 9, to permit of easy separate removal of said sections or replacements.

On opposite sides the block 1 has inlet ports 3 and exhaust ports 4, respectively in communication with interior hollows 7 and 5, and each hollow 7 and 5 are in communication by way of a pair of ports with registering ports 8 and 6 respectively in the bushing sections, the latter alined transversely relative to each other for occasional and successive communications with ports 19 in the rotary valve 15 and by way of the latter with the cylinder port 10—32 also.

The cylindrical rotary valve 15 is introduced into or removed from the hollows of said bushing sections 9 by way of the open right-hand end of the same and the block hollow 2. The opposite ends of the valve 15 have diminished end-threaded axial spindles 22 and 16 which respectively take on the nuts 27 and 17. The end nut 17 engages the inner raceway member of ball-bearing 13, the outer raceway member engaging the outer end of the abutting bushing section, and a cap-nut 12 closes the end space of the hollow 2 at 14, the cap-nut having an inlet port in communication with a supply-pipe 11 for introducing liquid lubricant under head. An annular end-plate 26 closes the opposite open end of the block hollow 2 and is secured by screws 25, this plate engaging the outer ends of the members of the raceway 24 which has its outer member engage the outer end of the left hand bushing section 9. The hollow stem of a bevel gear 36 is splined on the spindle 22 and held by the nut 27, the gear 36 being rotated by a pinion 28 on a rotary shaft driven by suitable connections to the crank-shaft, not shown, or other means.

The valve 15 has a longitudinal axial passage 23 communicating at one end with the space 14 in the cap-nut 12 and with the supply-pipe 11. Oil forced through said passage 23, and not otherwise distributed to the valve bearings and other movable parts, may escape through the open end at the right to drip upon the gearing 36—28 and thence fall into the crank-case not shown.

While the valve ports 19 are peripherally open segmentally they may be otherwise formed as may be convenient.

Near the ends of the valve 15, and at intervals medially therein, are annular grooves seating annular split-rings 18 which bear outwardly against the inner wall of the bushing sections 9 frictionally and by such friction are held from rotation. These split-rings also serve to partition the bearing interval of the valve 15 and the inner wall of the bushings to prevent leakage lengthwise from port to port.

Referring to Figs. 4 and 5, the numeral 20 denotes like but reversed longitudinally disposed sealing devices or wipers ranged alongside the longitudinal walls of the segmental ports 19 of the valve 15. They are seated in longitudinal grooves and upon bow shaped flat springs 34 mounted in the bottoms of the grooves, the springs yieldingly elastically thrusting the wipers outwardly to contact with the inner wall of the bushing sections 9 to close the interspace at each side of each port 19 against leakage, either of fuel or lubricating oil past them. To insure such leakage prevention, additional wipers 21 are seated similarly upon like springs in other longitudinal grooves in the valve between the wipers 20 circumferentially and function similarly. The wipers 20 have longitudinal lateral ribs 20' whose outer edges register with the port longitudinal walls being received in grooves in said walls. This affords wider bearing surfaces for the wipers 20 at the sides of the ports. As shown in Fig. 4, a number of shallow circular pits in staggered relation may be provided in the wiper surfaces to pick up and hold carbon deposits and the carbon then serves as an additional solid lubricant.

The valve 15 has small passages 31 leading from the axial passage 23 to the grooved seats of the annular split-rings 18, and other small passages 35 also extending radially from said passage 23 into the longitudinal seats of the longitudinal wipers 20 and 21, the liquid lubricant being delivered into said seats by centrifugal force of the rapidly rotating valve. The moving lubricant in the passage 23 serves to cool the valve measurably, and the ports 19 are proportioned suitably circumferentially of the valve to permit proper successive communications between the inlet- and exhaust-ports and the combustion chamber port 10—32 alternately as the valve 15 rotates. As no part of the circumferential periphery of the valve 15 can contact with the bushing sections 9 while in rotation, the valve continues unworn and is always operative, the wiping devices and split-rings insuring a lubricant seal between the valve and the bushings, so that there can be no leakage, a feature of economy in structure and in preventing loss or mixing of fuel and lubricant.

Having described our invention, what we claim as new, and desire to secure by Letters Patent, is:

1. In an internal combustion engine, a head therefor having a hollow bearing seat with intake and exhaust ports and a third port in communication with the combustion chamber of the engine, a rotary valve in said seat and not having circumferential contact therewith, said valve having a transverse wall recess positioned to effect communications successively between the intake and exhaust ports and said third port, having also circumferential annular grooves at each side of said passage, and having longitudinal grooves between said annular grooves at each end of and opening into said wall recess, and resiliently controlled wiper devices mounted in the annular and longitudinal grooves, each of the longitudinal devices having a side flange widening its peripheral surface, said valve having passages therein in communication with a supply of liquid lubricant under pressure and leading into said annular and longitudinal grooves.

2. In an internal combustion engine, a head therefor having a hollow bearing seat with intake and exhaust ports and having also a third port in communication with the combustion chamber of the engine, a rotary valve in said seat having a transversely positioned port adapted to be in communication successively with said intake and exhaust port and said third port, said valve having longitudinal grooves opening angularly into said transverse port, and wiper devices with side flanges mounted resiliently in said grooves to contact with the inner wall of said seat, said devices having therealong on their outer faces shallow pits to scrape, receive and hold carbon deposits gathered from said seat.

In testimony whereof we affix our signatures.

JOHN L. SMITH.
FOSTER L. GUSHARD.